Jan. 28, 1930. L. J. KLINE 1,744,972
VEHICLE COUPLING
Filed Nov. 21, 1927 2 Sheets-Sheet 2
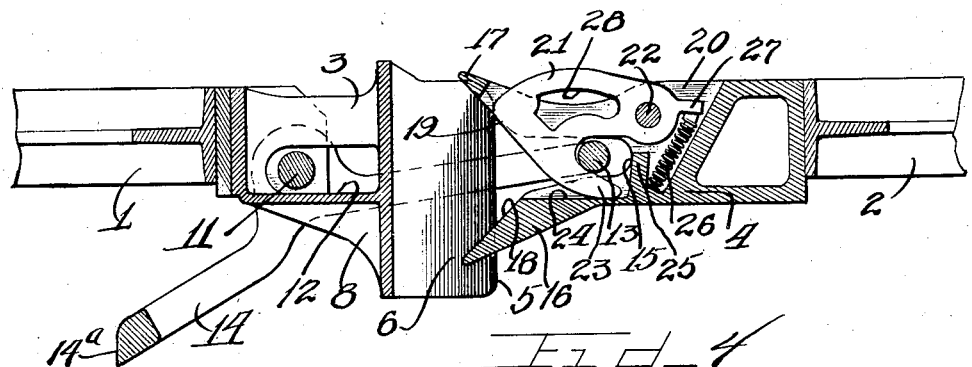
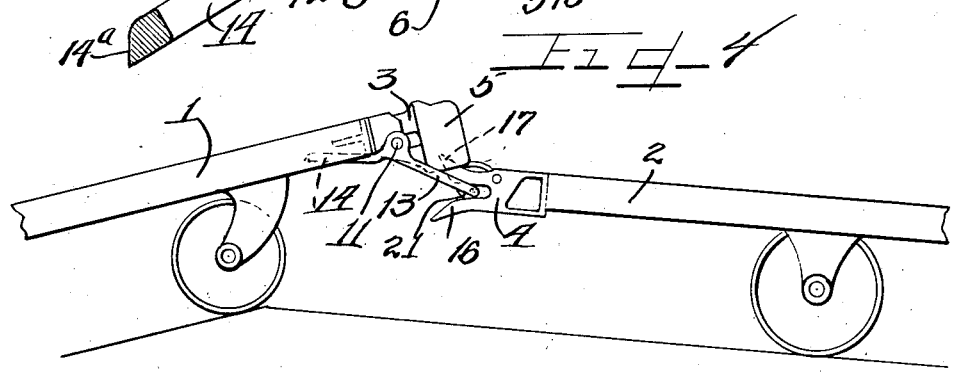
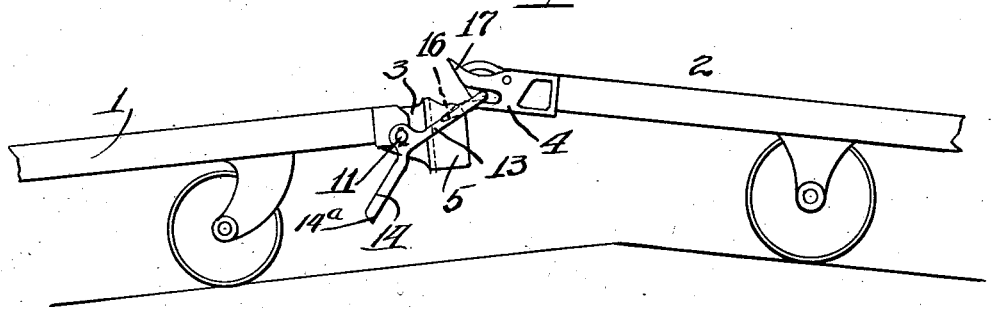
Inventor
Lawrence J. Kline.
by Charles W. Hills
Attys.

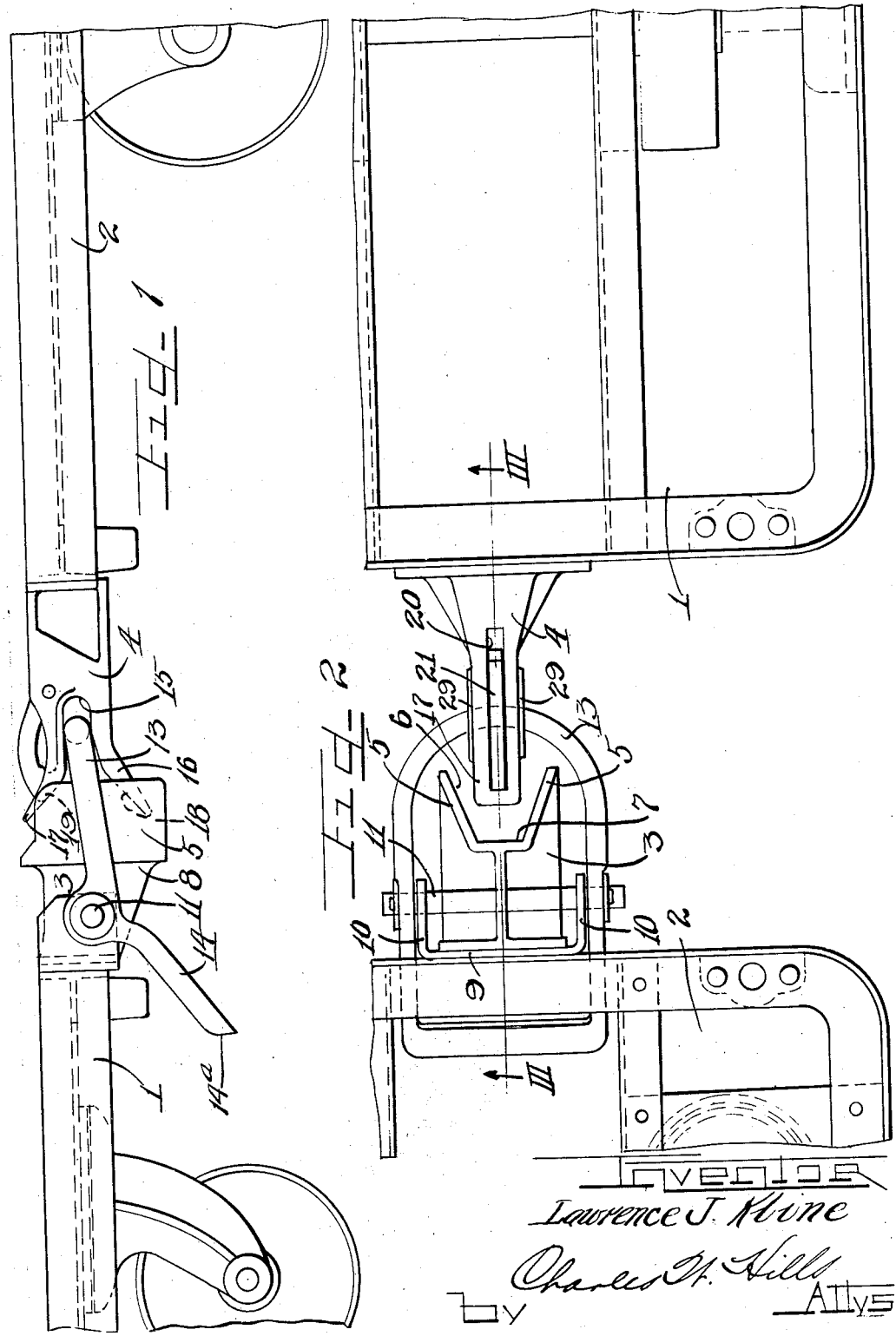

Patented Jan. 28, 1930

1,744,972

UNITED STATES PATENT OFFICE

LAWRENCE J. KLINE, OF CHICAGO, ILLINOIS, ASSIGNOR TO MERCURY MANUFACTURING COMPANY, A CORPORATION OF ILLINOIS

VEHICLE COUPLING

Application filed November 21, 1927. Serial No. 234,618.

This invention relates to new and useful improvements in couplings for vehicles, and the like, and more particularly to couplings which are highly desirable for use on industrial trucks and the like.

In the past couplings of this nature have been more or less objectionable in that they did not permit the proper coupling of trucks disposed on different levels. In many instances, these former known couplings were not sufficiently flexible to permit short turns by a train of trucks, or they would bind or jam when the trucks passed over uneven surfaces. Heretofore binding of component parts of a coupling has been a fruitful cause of vexatious delays and damages resulting from the overturning of vehicles or the breaking of parts thereof.

The present invention is designed to overcome the above noted defects and objections in the provision of a coupling so constructed that one element is at all times free to move in any direction relative to the other element whereby binding of the elements is effectively prevented.

The invention also seeks to provide a coupling adapted to readily and easily join two vehicles not in the same plane.

Another important object of the present invention is to provide a coupling wherein a substantially wide relative motion is permitted between the component parts, these parts being adapted to readily return to their original positions of substantial axial alignment without binding or becoming dislocated from their relative positions.

A further object of the present invention is to provide a coupling wherein one portion is freely and loosely received by another portion and will at all times remain within the latter portion regardless of the relative positions of the respective vehicles.

While some of the more salient features and characteristics of a device embodying this invention have been above pointed out, others will become apparent from the following disclosures.

The invention includes these and other features of construction and combinations of parts hereinafter described and shown in a preferred form in the drawings, as more particularly indicated by the claims.

In the drawings:

Figure 1 is a fragmentary view in elevation showing a coupling, embodying principles of the present invention, in operative position joining a pair of trucks.

Figure 2 is a fragmentary plan view of the coupling as shown in Figure 1.

Figure 3 is a fragmentary vertical sectional view taken substantially along the line III—III of Figure 2.

Figure 4 is a view similar to Figure 1 but showing one truck disposed higher than the other.

Figure 5 is a view similar to Figure 4 showing the other truck disposed in a higher position.

As shown in the drawings:

In the illustrated embodiment of this invention there is shown a pair of trucks 1 and 2, respectively, joined by a coupling embodying principles of the invention. The coupling comprises a bumper block 3 secured to the truck 1 and a drawbar head 4 secured to the truck 2.

The bumper block 3 is provided with a pair of laterally extending wings 5 having oblique inner faces 6, which define a channel-like notch or recess 7. The wings 5 are of greater vertical length than the remainder of the block and the arcuate reinforcing web 8 effectively supports the lower portion of the block and wings. Disposed adjacent the attached end of the block is a plate 9 having a laterally extending arm 10 thereon, in which a shaft 11 is journaled. As shown in Figure 3, the block is provided with an aperture or slot 12 to permit the shaft to pass therethrough. On the outer ends of the shaft, a bail 13 is secured in any desired manner. The bail has a substantially semicircular outer portion which, of course, permits greater angular variation between the adjacent ends of the trucks, whereby extremely sharp corners may be effectively turned. Preferably integral with the bail 13 is a balancing member 14 which comprises a pair of lugs and a yoke connecting the same. This balancing member is normally downwardly inclined and maintains the bail extended substantially horizontally when the trucks are coupled. The balancing member 14 is beveled as at 14ª to give a maximum displacement upward without displacing the floor boards of the truck.

The drawbar head 4 is provided with a slot 15 therein to receive the bail 13. Adjacent the slot and integral with the drawbar head is a pair of diverging prongs 16 and 17, respectively, the prong 16 extending downwardly and the prong 17 extending upwardly. The prongs are provided with sloping inner faces 18 and 19, respectively, to guide the balancing member into the slot 15.

The upper prong 17 is provided with a centrally disposed slot 20 therein to accommodate a catch or latching member 21 pivoted as at 22. The catch is provided with a depending inwardly curved tooth 23 which seats within a recess 24 in the lower prong 16 and below the slot 15. Terminating the recess 24 is an upwardly extending abutment 25 which, with the rear wall of the slot 20, acts as a housing for the spring 26, which exerts pressure on a lug 27 integral with the upper portion of the catch to maintain the same in closed position.

When it is desired to unite the component parts of the coupling, the trucks are merely moved towards each other, and the bail 13 held horizontally by the balance 14, enters the slot 15 and strikes the curved tooth 23 forcing it up against the action of the spring 26, and enters that portion of the slot 15 disposed behind the tooth, whereupon the spring 26 forces the catch into closed position and effectively joins the parts of the coupling. Since the pivot point 22 of the catch is disposed above the tooth 23, and the toe of the tooth 23 extends rearwardly of the bail 13, there is no tendency for the catch to loosen under strain imparted thereto by the pull of the other vehicles. The catch 21 is provided with a slot 28 adjacent the top thereof into which any desired means may be inserted to elevate the catch and thereby uncouple the trucks.

It is to be noted that when the parts of the coupling are united, the prongs 16 and 17 extend within the recess 7 but do not contact with the bumper block or with the rear wall of the recess, such contact being prevented by the abutment of the bail 13 with the rear wall of the recess 15 in case the trucks move towards each other. Obviously, when the trucks turn a corner, the prongs may contact with the inner surface or side of the wings 5, and binding of these parts is prevented by the provision of arcuate ribs 29 on the sides of the upper prong 17.

Assuming the trucks to be in the position shown in Figure 4 where the rear end of the truck 1 is higher than the rear end of the truck 2, the trucks may be effectively coupled without any adjustment of the parts. The balance 14 maintains the bail 13 in substantially horizontal position and when the trucks are brought together the balance will strike against the surface 19 of the upper prong 17, ride along this surface into the slot 15 and engage with the catch 21 in the previously described manner.

If the trucks are to be coupled when in the position shown in Figure 5, truck 2 being higher, the bail will abut the surface 18 of the lower prong 16 and ride therealong into engagement with the catch 21.

It is to be especially noted that when the trucks are in any position as shown in Figures 1, 4, and 5, or if their angular relation be varied, at least one of the prongs is at all times disposed between the wings 5. This is accomplished by properly proportioning the length of the bail and the sides of the prongs and wings. If, for instance, the truck 1 is above truck 2, prong 17 will be disposed between the wings, and if truck 2 is higher, prong 16 will be disposed therebetween. With the parts so proportioned that at least one prong is at all times between the wings, binding of the elements is effectively prevented and they are maintained in centralized relationship whereby their former axially aligned position is easily and readily resumed when the trucks ride upon an even surface. The flexible characteristic of the coupling is further accentuated by permitting the bail to move longitudinally within the slot 15 when in engaged position, but which motion is limited so as to prevent the prongs from contacting with the bumper block. With the use of the couplings as described herein, whole trains may be formed, and may pass over rough uneven or inclined surfaces, or turn extremely sharp corners with no over or under-riding of adjacent trucks and with no objectionable binding of the component parts of the couplings or danger of overturning any trucks.

From the foregoing it is apparent that I have provided a novel coupling highly desirable for industrial trucks and the like, which is extremely flexible, permits relative motion in any direction, will not bind, and the component parts of which may be united readily and easily when the trucks are not in the same plane. Moreover, the coupling as described herein is of simple and durable construction and may be economically manufactured.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a coupling for a pair of vehicles, a draw bar head for attachment to one of said vehicles and including diverging prongs and locking means for engaging a bail, and a bumper block for attachment to the other vehicle including a recess for receiving said prongs and being of such a height as will permit of one of said prongs being at all times therein when said vehicles are coupled together, and a bail member arranged to extend between said prongs and to be engaged by said locking means, said prongs being of such proportion as to at all times have their free ends spaced from and out of contact with the portion of said block defining the rear of said recess when the vehicles are coupled together.

2. As an article of manufacture, a coupling element including a bumper block, a bail element pivotally connected to and extending from said block, and balancing means associated with the pivotal portion of said bail element and arranged and proportioned to hold said bail in a substantially horizontal position when the vehicles are uncoupled irrespective of the position of said block when in use.

3. In a coupling for a pair of vehicles, a pivotally mounted member attachable to one of said vehicles, means attachable to the other vehicle for engaging said member to couple said vehicles, and balancing means associated with the pivoted portion of said pivotally mounted member and arranged and proportioned to hold said member in a substantially horizontal position when the vehicles are uncoupled regardless of the position of the vehicle attached to the pivotally mounted member to facilitate the coupling of the vehicles when they are not in the same plane.

4. In a coupling for a pair of vehicles, a pivotally mounted member attachable to one of said vehicles, means attachable to the other vehicle for engaging said member to couple said vehicles, and balancing means associated with the pivoted portion of said pivotally mounted member and arranged and proportioned to hold said member in a substantially horizontal position when the vehicles are uncoupled regardless of the position of the vehicle carrying said pivotally mounted member to facilitate the coupling of the vehicles when they are not in the same plane, said member including a U-shaped loop having its ends pivotally supported and said balancing means being connected to the pivotal ends of said loop and being offset downwardly relative to said loop.

In testimony whereof I have hereunto subscribed my name at Chicago, Cook County, Illinois.

LAWRENCE J. KLINE.